(12) United States Patent
Muthukkaruppan et al.

(10) Patent No.: US 10,521,396 B2
(45) Date of Patent: *Dec. 31, 2019

(54) PLACEMENT POLICY

(71) Applicant: Facebook, Inc., Menlo Park, CA (US)

(72) Inventors: Kannan Muthukkaruppan, Union City, CA (US); Karthik Ranganathan, Fremont, CA (US); Liyin Tang, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 556 days.

This patent is subject to a terminal disclaimer.

(21) Appl. No.: 14/996,627

(22) Filed: Jan. 15, 2016

(65) Prior Publication Data

US 2016/0132518 A1 May 12, 2016

Related U.S. Application Data

(63) Continuation of application No. 13/731,722, filed on Dec. 31, 2012, now Pat. No. 9,268,808.

(51) Int. Cl.
*G06F 16/10* (2019.01)
*G06F 16/13* (2019.01)
(Continued)

(52) U.S. Cl.
CPC .......... *G06F 16/134* (2019.01); *G06F 16/178* (2019.01); *G06F 16/183* (2019.01);
(Continued)

(58) Field of Classification Search
CPC ......... G06F 17/30094; G06F 17/30174; G06F 17/30203; G06F 17/30339; G06F 17/30159; G06F 17/30221; G06F 17/30312; G06F 16/134; G06F 16/183; G06F 16/2282; G06F 16/178; G06F 16/22; G06F 16/1752; G06F 16/185
See application file for complete search history.

(56) References Cited

U.S. PATENT DOCUMENTS 5,555,404 A 9/1996 Torbjørnsen et al.
6,983,317 B1 1/2006 Bishop et al.
(Continued)

OTHER PUBLICATIONS

Gao et al., "Scalable Inverted Indexing on NoSQL Table Storage", 2010, 12 pages. (Year: 2010).*
(Continued)

*Primary Examiner* — Joshua Bullock
*Assistant Examiner* — Tiffany Thuy Bui
(74) *Attorney, Agent, or Firm* — FisherBroyles, LLP (57) ABSTRACT

A region-based placement policy that can be used to achieve a better distribution of data in a clustered storage system is disclosed herein. The clustered storage system includes a master module to implement the region-based placement policy for storing one or more copies of a received data across many data nodes of the clustered storage system. When implementing the region-based placement policy, the master module splits the received data into one or more regions, where each region includes a contiguous portion of the received data. Further, for each of the plurality of regions, the master module stores complete copies of the region in a subset of the data nodes.

20 Claims, 8 Drawing Sheets

(51) Int. Cl.
  *G06F 16/178* (2019.01)
  *G06F 16/182* (2019.01)
  *G06F 16/22* (2019.01)
  *G06F 16/185* (2019.01)
  *G06F 16/174* (2019.01)

(52) U.S. Cl.
  CPC ...... *G06F 16/2282* (2019.01); *G06F 16/1752* (2019.01); *G06F 16/185* (2019.01); *G06F 16/22* (2019.01)

(56) References Cited

U.S. PATENT DOCUMENTS

| | | |
|---|---|---|
| 7,406,575 B2 | 7/2008 | Lam et al. |
| 7,769,890 B2 | 8/2010 | Littlefield et al. |
| 7,979,404 B2 | 7/2011 | Sim-Tang |
| 8,745,217 B2 | 6/2014 | Penumaka et al. |
| 9,075,883 B2 | 7/2015 | Verkasalo |
| 9,268,808 B2 | 2/2016 | Muthukkaruppan et al. |
| 9,607,049 B2 | 3/2017 | Nallapaneni et al. |
| 2006/0064416 A1 | 3/2006 | Sim-Tang |
| 2006/0179080 A1 | 8/2006 | Meek et al. |
| 2007/0245103 A1 | 10/2007 | Lam et al. |
| 2008/0065704 A1 | 3/2008 | MacCormick et al. |
| 2008/0147836 A1 | 6/2008 | Littlefield et al. |
| 2010/0235606 A1* | 9/2010 | Oreland ............ G06F 17/3033 711/173 |
| 2011/0264663 A1 | 10/2011 | Verkasalo et al. |
| 2012/0324073 A1 | 12/2012 | Dow et al. |
| 2012/0324112 A1 | 12/2012 | Dow et al. |
| 2013/0036149 A1* | 2/2013 | Kosuru ............ G06F 9/5027 709/201 |
| 2013/0191455 A1 | 7/2013 | Penumaka |
| 2013/0254240 A1* | 9/2013 | Kurita ............ G06F 17/30584 707/802 |
| 2013/0262393 A1 | 10/2013 | Mrak et al. |
| 2013/0282650 A1 | 10/2013 | Zhang et al. |
| 2014/0032593 A1 | 1/2014 | Libenzi et al. |
| 2014/0032595 A1 | 1/2014 | Makkar et al. |
| 2014/0067820 A1 | 3/2014 | Wilkins et al. |
| 2014/0136779 A1 | 5/2014 | Guha et al. |
| 2014/0143367 A1* | 5/2014 | Dahlin ............ G06F 3/0617 709/213 |
| 2014/0149356 A1 | 5/2014 | Agarwal et al. |
| 2014/0188825 A1 | 7/2014 | Muthukkaruppan et al. |
| 2015/0081773 A1 | 3/2015 | Cheng et al. |
| 2016/0092532 A1 | 3/2016 | Jia et al. |

OTHER PUBLICATIONS

Non-Final Office Action dated Aug. 28, 2017 for U.S. Appl. No. 14/500,522 for Jia, Y. et al., filed Sep. 29, 2014.
"Rack-aware Replica Placement," [online], Apache™ Hadoop®, Apache Software Foundation, https://issues.apache.org/jira/browse/HADOOP-692, 2 pages, Nov. 17, 2006.
Final Office Action dated Feb. 27, 2015, U.S. Appl. No. 13/731,722 of Muthukkaruppan, K. et al., filed Dec. 31, 2012.
Non-Final Office Action dated May 28, 2015, for U.S. Appl. No. 13/731,722 of Muthukkaruppan, K. et al., filed Dec. 31, 2012.
Non-Final Office Action dated Nov. 5, 2014, U.S. Appl. No. 13/731,722 of Muthukkaruppan, K. et al., filed Dec. 31, 2012.
Notice of Allowance dated Oct. 19, 2015, U.S. Appl. No. 13/731,722 of Muthukkaruppan, K. et al., filed Dec. 31, 2012.
U.S. Appl. No. 13/731,722 of Muthukkaruppan, K. et al., filed Dec. 31, 2012.
U.S. Appl. No. 14/500,522 of Jia, Y. et al., filed Sep. 29, 2014.

* cited by examiner

PLACEMENT POLICY

CLAIM OF PRIORITY

This application is a Continuation of U.S. patent application Ser. No. 13/731,722 entitled "PLACEMENT POLICY," filed Dec. 31, 2012, which is expressly incorporated by reference herein.

FIELD

At least one embodiment of the present invention pertains to clustered storage systems, and more particularly, to a placement policy for managing data in a clustered storage system which provides better fault tolerance and data locality.

BACKGROUND

Developments in computer and networking technology have given rise to applications that require massive amounts of data storage. For example, millions of users can create web pages and upload images and text to a social media website. Consequently, such a social media website can accumulate massive amounts of data each day and therefore need a highly scalable system for storing and processing data. Various tools exist to facilitate such mass data storage.

HBase is a popular open source database that supports large-scale data-intensive distributed applications, by enabling applications to interact with a cluster of thousands of computers (also referred to as nodes) and petabytes of data. HBase is designed to manage large-scale structured datasets. In HBase, the data-intensive distributed applications store their data in structured datasets called HBase tables, where the tables are made of rows and columns. The HBase tables are typically developed using Java and may be, for example, modeled after Google's Bigtable. Data tables in HBase are partitioned into data segments called regions, where a contiguous range of rows of an HBase data table forms a data congruent region. In other words, the regions in the HBase database are the equivalent of range partitions in relational database management system (RDBMS).

Further, in at least some HBase implementations, HBase runs on top of a Hadoop framework, providing Bigtable-like capabilities for Hadoop. Hadoop uses a distributed, scalable, portable file system, called Hadoop Distributed File System (HDFS), to distribute a massive amount of data among data nodes (also referred to as slave nodes) in a Hadoop data node cluster. Hadoop includes a metadata node to host a file system index. In order to reduce the adverse impact of power outage or network failure (including switch failure) of a data node, Hadoop typically replicates stored data on different data nodes.

More specifically, one or more replicas of a region of data are created. In Hadoop, the replicas may be effectively stored across different data nodes by splitting the region into smaller segments of data called data blocks. The data blocks of a particular region are stored across the different data nodes. Such scattered data blocks lack the data congruity provided by the regions, where each region includes a contiguous range of rows of a data table.

SUMMARY

Techniques introduced herein include storing data in a clustered storage system utilizing a region-based placement policy that improves fault tolerance and data locality in the clustered storage system. In one embodiment, a computer-implemented method for storing data in a clustered storage system is provided. The clustered storage system includes a plurality of storage nodes operable to store the data associated with the clustered storage system.

In embodiments, a master module, associated with the clustered storage system, receives client data to be stored in the clustered storage system. The client data is provided by one or more client systems serviced by the clustered storage system. The master module then splits the client data into a plurality of regions, where each region includes a contiguous portion of the client data. For each of the plurality of regions, the master module stores a complete replica of the region in a single storage node of the plurality of storage nodes. Thus, a region-based data placement can be achieved in a clustered storage system.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. All occurrences of such phrases in this specification do not necessarily refer to the same embodiment.

The region-based placement policy disclosed herein can be used to improve distribution of data blocks and its associated replica data blocks in a HBase-Hadoop based distributed storage system. Various embodiments of the region-based distribution of data blocks can provide an increase in fault tolerance of the storage system; better load management across the different storage nodes in the storage system; and better interconnect traffic management within the storage system. In embodiments of the disclosed distributed storage system, a region of data is stored in a particular data node and replicated across different data nodes to provide fault tolerance.

Typically, the replicas of the region are effectively stored across different data nodes by splitting the region into smaller segments of data called data blocks. These data blocks are then stored or "scattered" across the different data nodes. Consequently, when a primary server storing the region experiences power failure, any client that requests the data associated with the region is directed to the scattered replicas. In such a traditional "scattered" replication system, when a primary server storing the region experiences power failure, any client requesting the data associated with the region is directed to the scattered replicas. Identifying the scattered data nodes and assembling the region from the multiple scattered data nodes is responsible at least in part for substantially increasing overhead in servicing the client's requests.

In contrast to this "scattered" approach, the region-based placement policy disclosed herein allows each replica of all the replicated data blocks (belonging to the region) to be stored in a single data node. Such region-based placement provides for data congruity (e.g., where each region includes a contiguous range of rows of a data table) amongst the stored replica data blocks. Therefore, in the event of power outage or network failure of a primary data node hosting the region of data, the distributed storage has at least one "replica" data node that contains all the data blocks associated with the region. This replica node can then support any client request for the region of data without the increased overhead or latency issues associated with typical scattered replication approaches. Additionally, the region-based distribution of data blocks increases the fault tolerance of the storage system. This is because the chances of a set of randomly failed data nodes having at least one overlapping data block in the region-based data placement is much lower than the chances of the same scenario happening in the scattered-based data placement. In other words, a set of specific data nodes would have to fail to lose data in the region-based data placement as opposed to the failure of any set of data nodes in the scattered data placement.

The above description provided a brief introduction to a region-based replication system. The following description, accompanying FIGS. 1-8 of this application, provides further details of the implementation of such a region-based replication approach.

Figure 1:
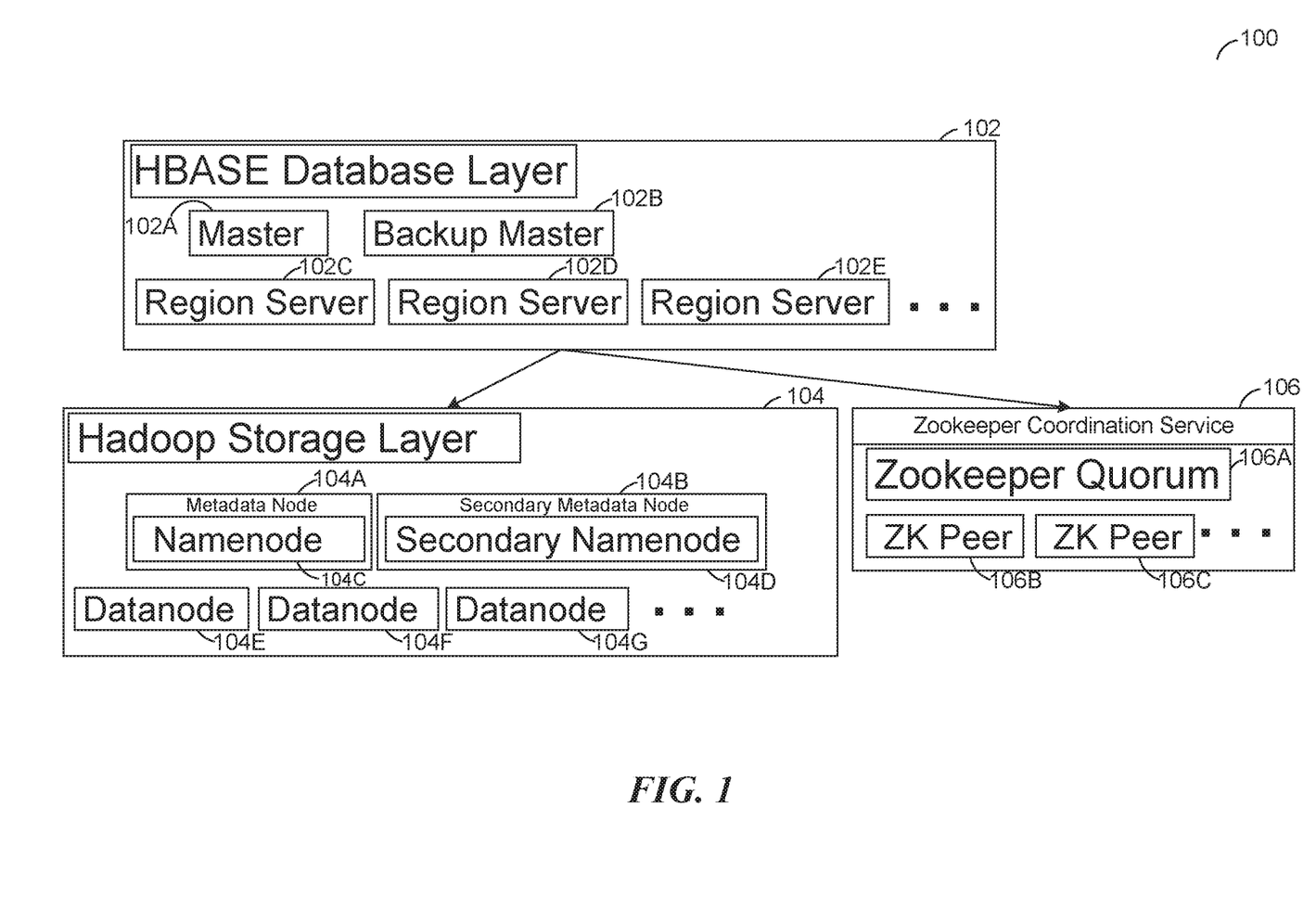
FIG. 1 illustrates an example of a HBase-Hadoop clustered storage system.

FIG. 1 illustrates an example of an HBase-Hadoop clustered storage system 100 ("clustered storage"), where the region-based placement policy is implemented to improve data placement within the clustered storage system 100. The clustered storage system 100 includes an HBase Database layer 102 ("HBase") that runs on top of a Hadoop storage layer 104 ("Hadoop"). Clients may communicate with the clustered storage system 100 via a network, which can be, for example, the Internet, a LAN, or any other type of network or combination of networks. Each of the clients may be, for example, a conventional personal computer (PC), server-class computer, workstation, handheld computing and communication device, or the like.

In FIG. 1, HBase 102 includes a Master 102A, backup of the Master 102B (in case the Master 102A fails) and a plurality of Region Servers 102C, 102D and 102E.

The Master (e.g., HMaster or the master module) is the "master server" for HBase. An HBase cluster typically has one active Master. In order to serve as an HMaster 102A, a server 214, 202 runs an HMaster service which helps the server perform the functions of the HMaster 102A. The HMaster 102A splits the data tables into regions and assigns the resulting regions to the available Region Servers for managing all data access requests for the assigned regions. Further, the HMaster 102A balances the load of the Region Servers by re-assigning the stored regions among them. Further, HMaster 102A uses a Zookeeper coordination service 106 to keep track of Region Servers and to provide information for clients (like which Region Server holds the ROOT table of the database). Additionally, as mentioned above, the HMaster 102A is not involved in read/write operations and such data access operations are handled by the Region Servers.

Figure 3:
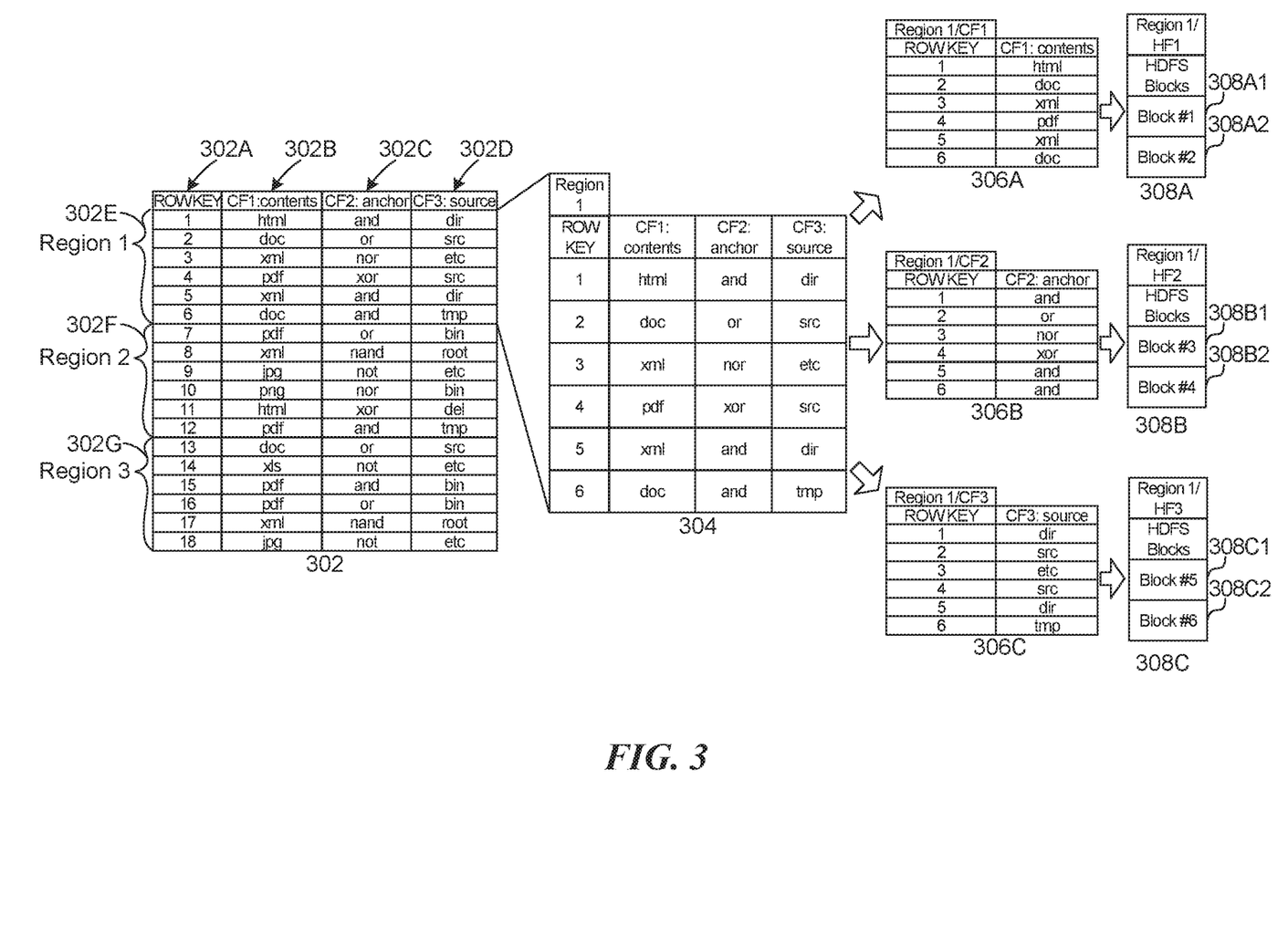
FIG. 3 illustrates an example of a process used by the clustered storage to store the data received from a client.

Each Region Server is responsible for managing all data access requests from clients to the regions managed by the Region Servers. In order to serve as a Region Server 102C-102E, a server 214, 202 runs a RegionServer service which helps the server perform the functions of the Region Server 102C-102E. Typically, an instance of the RegionServer service is instantiated in each of the servers 214, 202, but not in the server 214, 202 hosting the HMaster 102A. For each region (i.e. a set of contiguous rows) of an HBase data table that needs to be stored in the clustered storage system 100, the HMaster 102A assigns the region to an available Region Server 102C-102E. The Region Server 102C-102E that receives the assignment splits the region into a plurality of columns (i.e. the set of contiguous rows are split along the various columns) corresponding to the columns of the HBase data table associated with the region. The Region Server 102C-102E then groups each of the split columns into one or more files. The one or more files are referred to as the "HFile" in HBase. In some embodiments, the Region Server 102C then requests Hadoop 104 to store each of the one or more HFiles within the Hadoop storage layer 104. FIG. 3 provides additional detail on how structured data, such as an HBase data table, is stored and managed in the clustered storage system 100.

Further, the Region Servers 102C-102E can communicate with each other through interconnects (not shown in FIG. 1). The interconnect may be, for example, a local area network (LAN), wide area network (WAN), metropolitan area network (MAN), global area network such as the Internet, a Fibre Channel fabric, or any combination of such interconnects. In some embodiments, the interconnect can include a network switch for processing and routing data between the nodes under network protocols, including TCP/IP.

In FIG. 1, the Zookeeper Coordination Service 106 also includes a Zookeeper Quorum 106A ("Zookeeper") that manages one or more Zookeeper peers 106B, 106C ("ZK Peers") providing Zookeeper coordination services. In order to serve as a ZK Peer 106B-106C, a server 214, 202 runs an instance of Zookeeper service (i.e. a software) which helps the server perform the functions of the ZK Peer 106B-106C. The ZK Peers 106B-106C provide coordination services between the various entities of the clustered storage system 100. The coordination service could include, for example, synchronization, configuration maintenance, groups, and naming for distributed applications. For example, when a client requests a connection to a data node 104E-104G in Hadoop 104, the data node 104E-104G may forward the connection request to a leader ZK Peer among the one or more ZK Peers 106B-106C. The leader ZK Peer may then obtain a consensus from the remaining ZK Peers 106B-106C before forwarding the decision to the data node 104E-104G from which the client requested the connection. Upon receiving a consensus or votes from the leader ZK Peer, the data node 104E-104G accepts the client's connection request.

Figure 2:
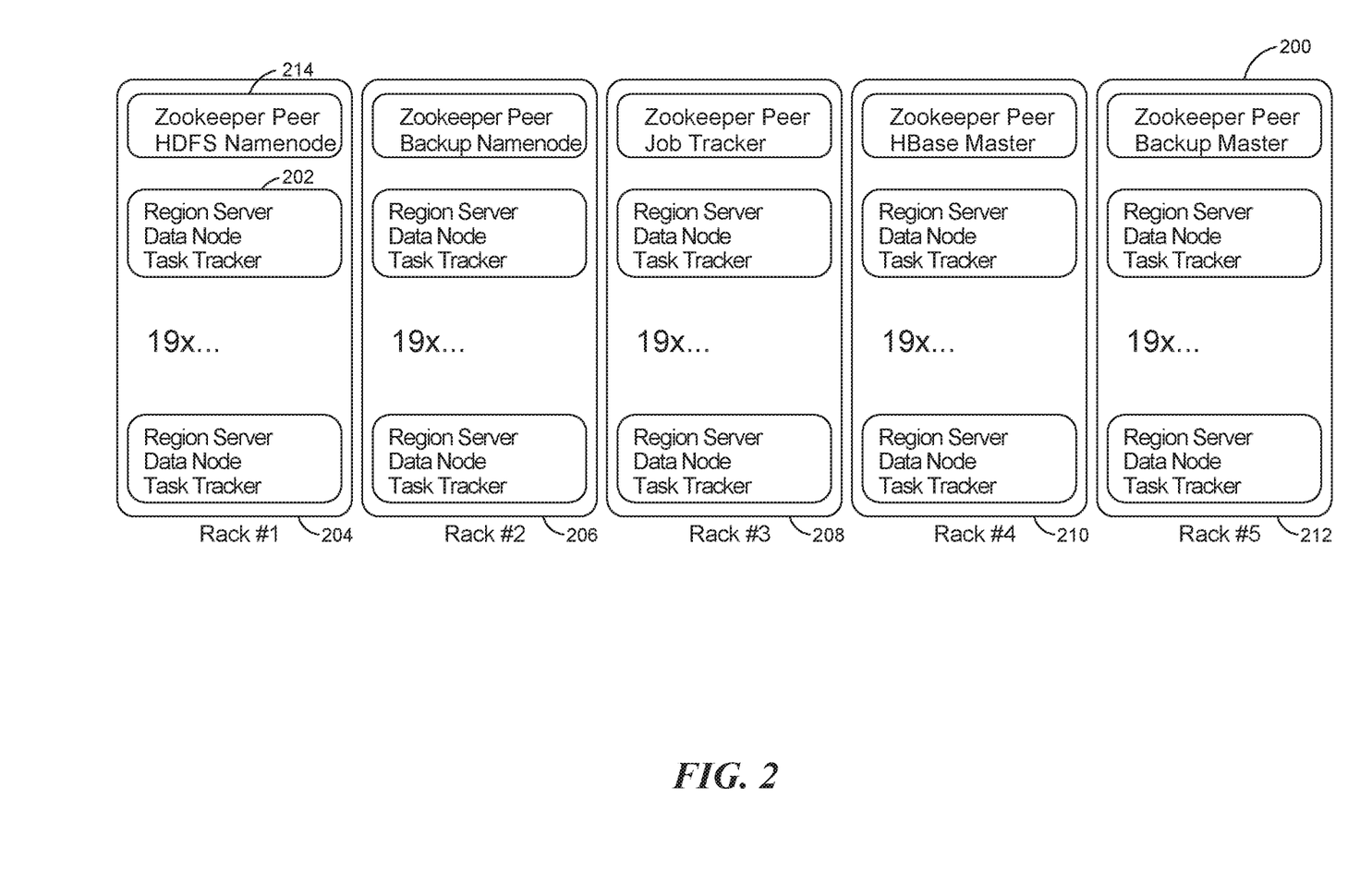
FIG. 2 provides a process layout in a HBase-Hadoop clustered storage system, implemented using one or more racks of commodity-class servers, where the invention is practiced.

The Hadoop 104 includes a metadata node 104A and a plurality of data nodes 104E, 104F and 104G. The data nodes 104E-104G can communicate with each other through the interconnect (not shown in FIG. 1) shared with the Region Server 102C-102E that is collocated in each of the data nodes. FIG. 2, discussed below, provides additional details on the data node/Region Server collocation.

Hadoop 104 also includes a NameNode service 104B running on the Metadata node 104A to provide metadata services within Hadoop 104, including maintaining the file system namespace and controlling access by external clients. The NameNode service 104C can store the file system index, including the mapping of blocks to files and file system properties, in a file called FsImage in the Metadata node. In some embodiments, there may be a secondary Metadata node 104B running a secondary NameNode service 104D. The secondary Metadata node 1048 serves as a backup in case the Metadata node 104A fails.

Each data node 104E-104G is responsible for storing the data associated with the HFiles, where the HFiles's data is divided into one or more data blocks (i.e. a region is converted into one or more HFiles which are in turn stored as data blocks in the data nodes 104E-104G). In one embodiment, the size of a data block is 64 MBs. The data blocks are stored in a distributed manner across the data nodes 104E-104G. The Region Servers 102C-102E act as the clients to Hadoop 104, requesting services such as creating, deleting, or moving the respective HFiles assigned to the Region Servers.

Hadoop 104 uses HDFS to provide functions like a conventional hierarchical file system to its client. Files can be created, deleted, or moved in the HDFS. As discussed earlier, multiple replicas of a region are created. In other words, the data blocks associated with each region's HFiles are typically replicated across multiple data nodes to reduce the loss of the blocks when a data node 104E-104G fails. Therefore, Hadoop 104 in the clustered storage system 100 can, but does not necessarily, use a conventional RAID architecture to achieve data reliability. FIG. 3 provides additional details on how structured data, such as an HBase data table, is stored and managed in the clustered storage system 100. Further, in Hadoop 104, file operations are controlled by the NameNode service 104C running on the Metadata node 104A. Finally, in some embodiments, the data nodes 104E-104G send periodic heartbeat messages including block reports to the Metadata node 104A. The Metadata node 104A validates its block mapping and other file system metadata using the periodic block reports.

FIG. 2 provides a process layout of an HBase-Hadoop clustered storage system 100, implemented using one or more racks of commodity-class servers, where the invention is practiced. The rack-based clustered storage system is used to implement the region-based placement policy for storing data in the clustered storage system 100. In FIG. 2, the clustered storage system 100 comprises a total of five racks and each rack 204-212 includes 20 servers. In each rack (e.g. 204), one commodity server 214 is dedicated to run Zookeeper services 106 to help coordinate and manage the resources of the cluster 100. Further, in rack #1 204 and rack #2 206, the HDFS Namenode (i.e. the Namenode service 104B) and the HDFS Backup Namenode 104D are collocated with the Zookeeper services 106. In rack #4 210 and rack #5 212, the HBase Master 102A and HBase Backup Master 102B are collocated with the Zookeeper services 106 (i.e. rack #4 runs an instance of the HMaster service and an instance of the Zookeeper service). In rack #3 208, a job tracker service is collocated with the Zookeeper service 106.

The job tracker service helps split tasks from clients into sub-tasks that can then be run on each server that hosts a data node using a task tracker service.

Further, in each rack, 19 of the 20 servers serve as data nodes. In order to serve as a data node, a server (e.g. 202) runs a DataNode service which helps the server respond to read and write requests for data blocks. The DataNode services also help the server respond to requests from the Metadata node 104A for creating, deleting and replicating data blocks. Also, each of the data nodes is connected to each other via a network switch on each rack. Hence, the network speed between nodes within a rack can be faster than the network speed between nodes in different racks. The clustered storage system 100 may take that fact into account when data nodes are chosen for replicating the stored data.

In addition, the clustered storage system 100 initiates and runs a Regional Server 102C-102E in each of the servers that also serves as a data node. By collocating a Region Server 102C with a data node 104E in a server 202, the clustered storage system 100 can create data locality between the data (i.e. regions) managed by the Region Server and the data stored in the data node. So, when the Region Server 102C receives a data access request from a client for data (i.e. region) managed by the Region Server 102C, the Region Server 102C can send an access request to the DataNode service running on the same server 202 and respond to the client request with minimal latency.

Figure 4:
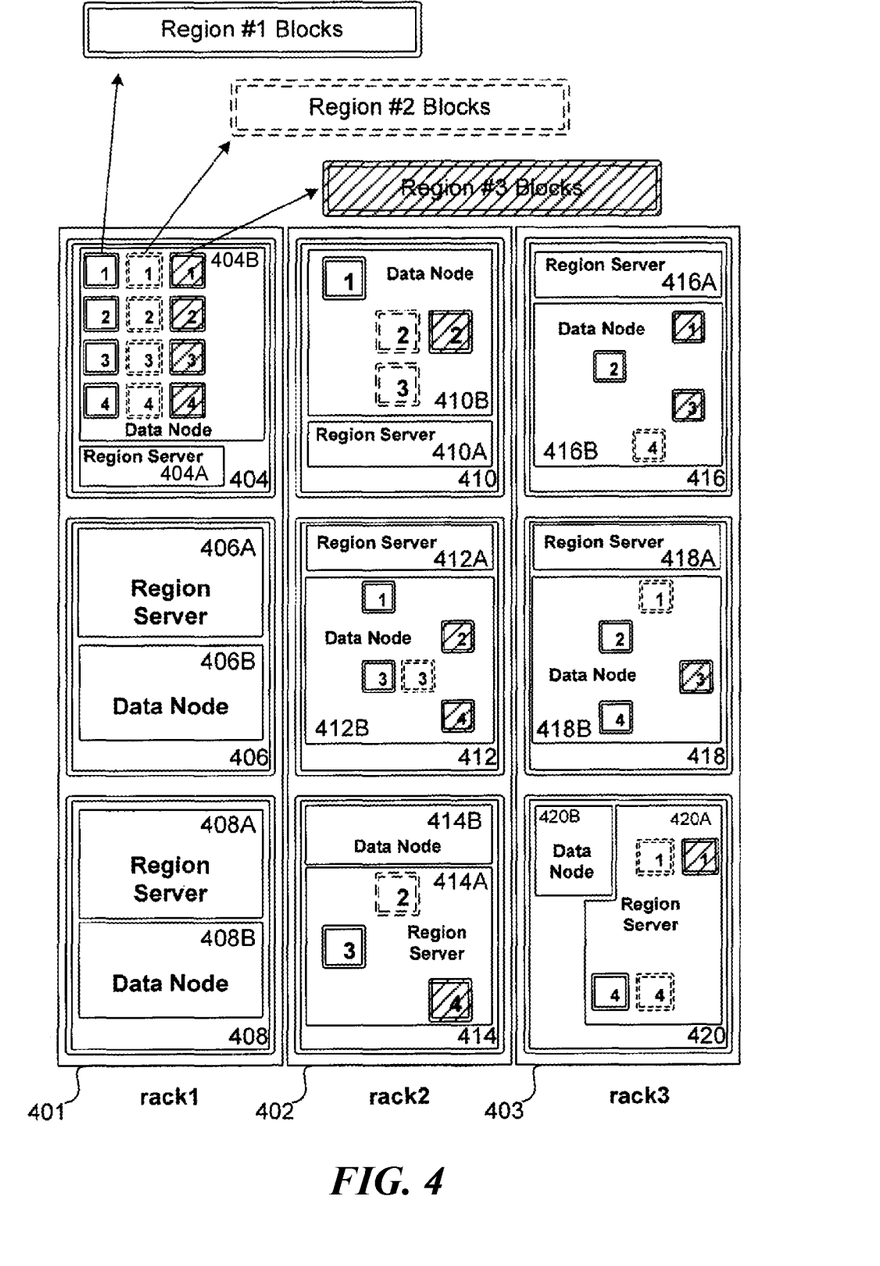
FIG. 4 illustrates the distribution of stored data (as data blocks) utilizing a rack-aware replica placement policy.
Figure 5:
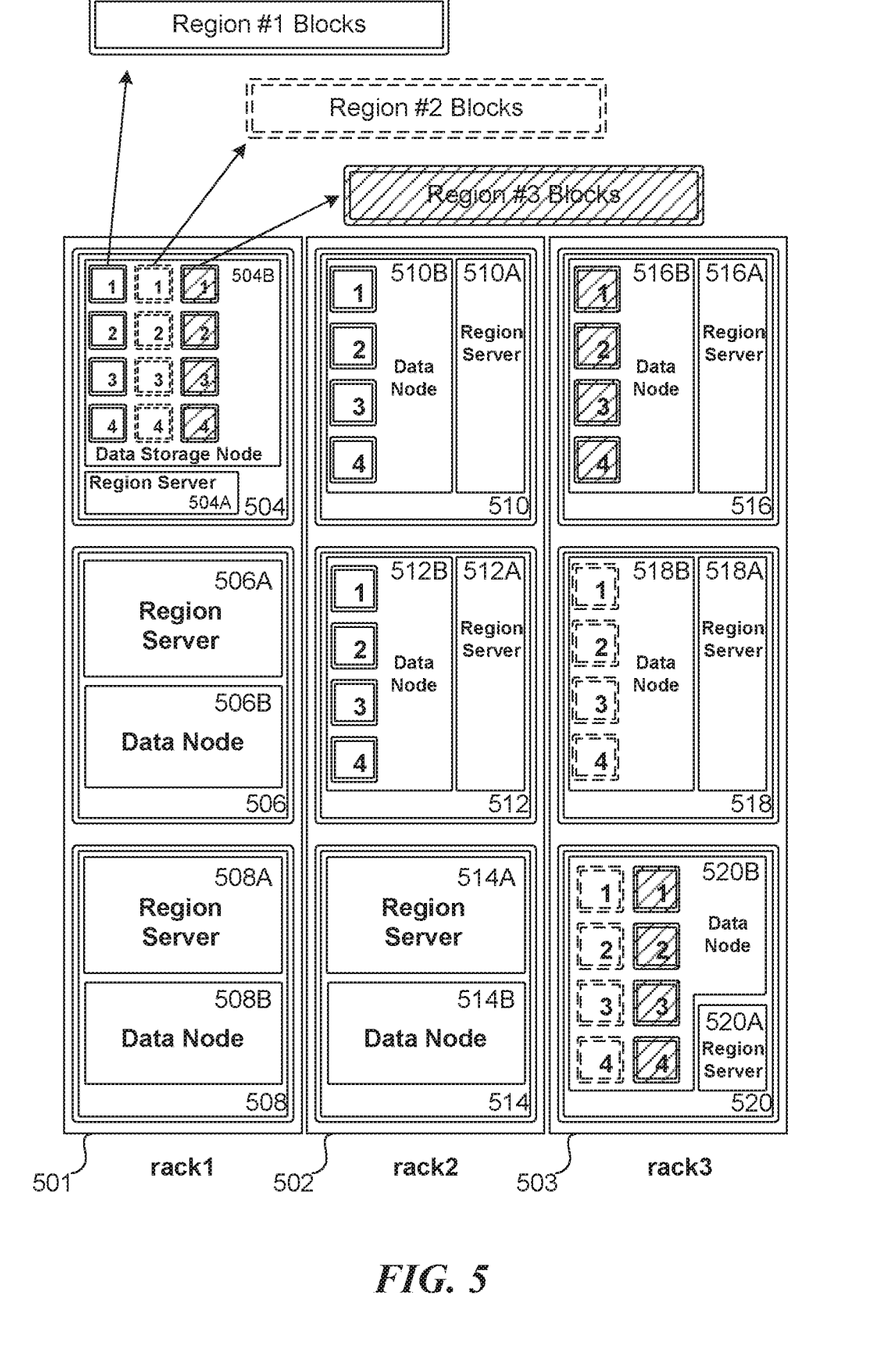
FIG. 5 illustrates the distribution of stored data (as data blocks) utilizing a region-based placement policy.

In the present invention, the clustered storage system 100 creates a similar data locality between not only Region Server 102C and its collocated data node 104E, but also between the other data nodes where the data is replicated and their respective collocated Region Servers. FIGS. 4-5 explain in detail how data locality is achieved between not only a primary data node and its collocated Region Server but also among the secondary and tertiary data node/Region Server pairs where the data from the primary data node is replicated.

FIG. 3 illustrates an example of a process used by the clustered storage system 100 for storing data received from a client. The data layout among regions in a table in the clustered storage system 100 is shown. As discussed with reference to FIGS. 1 and 2, in clustered storage system 100, the clients store their data in structured datasets called HBase tables 302, where the tables are made of rows and columns. When a client wants to store data in the clustered storage system 100, HBase 102 receives the data from clients in the form of HBase data tables 302. In the clustered storage system 100, HBase 102 converts the HBase data tables 302 into a plurality of files (i.e. HFiles), which can then be stored and retrieved as files from Hadoop 104.

In FIG. 3, when converting the HBase data table 302 into a plurality of HFiles 308A-308C, the HMaster 102A of the HBase 102 first partitions the HBase table 302 into segments called regions, where a contiguous range of rows of the HBase data table 302 forms a region. Here, HMaster 102A partitions the HBase table 302 into three regions, with region 1 302E including the first six rows (i.e. row key 302A from 1 through 6), region 2 302F including the next six rows (i.e. row key 302A from 7 through 12), and region 3 302G including the last six rows (i.e. row key 302A from 13 through 18).

Figure 6:
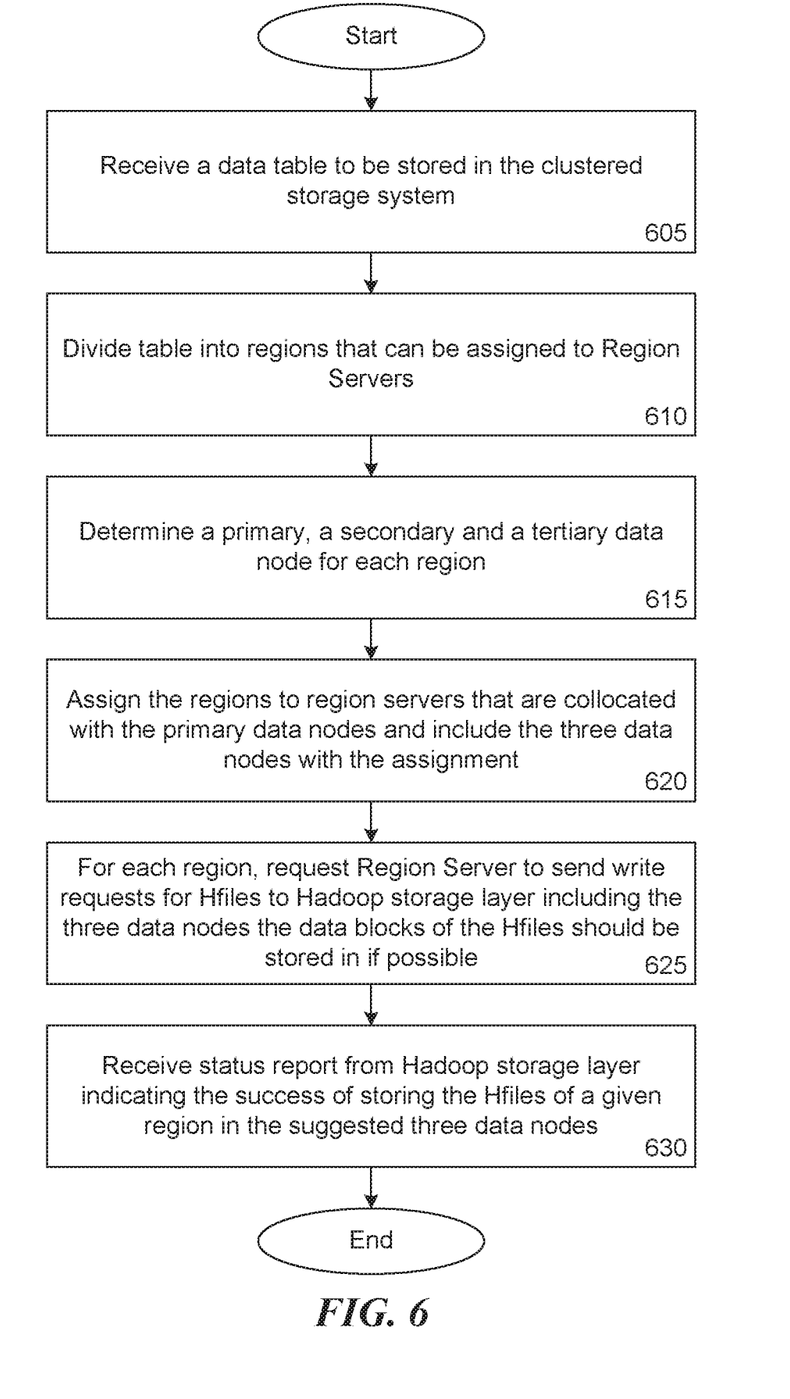
FIG. 6 illustrates an example process, based on the region-based placement policy, which is used by the clustered storage to store a received data table.
Figure 7:
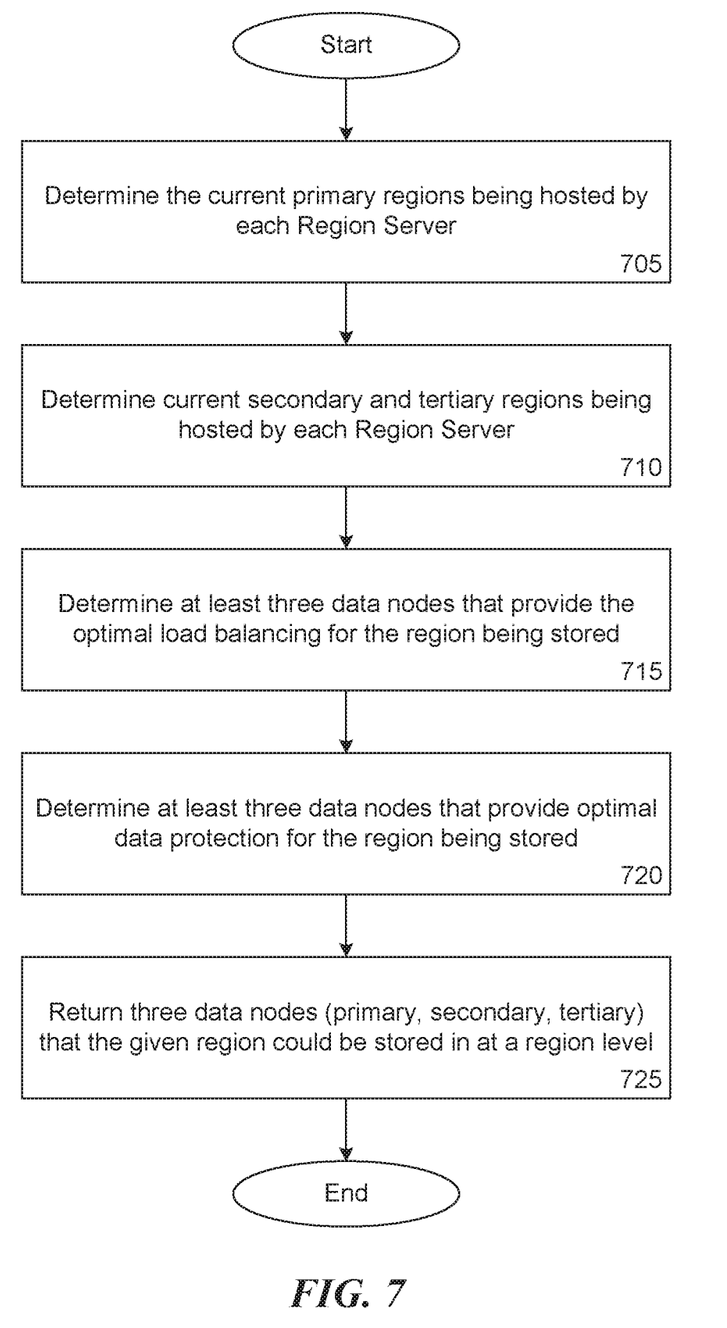
FIG. 7 illustrates an example process used by the clustered storage for determining data nodes for storing the replicas of a set of data.

Once the HBase data tables 302 are partitioned into regions, the HMaster 102A then assigns each of these regions to one of the available Region Servers 102C-102E. In one instance, the HMaster 102A could determine which Region Server a particular region should be assigned to based on the current work load (e.g. number of regions currently managed by the particular Region Server) of the available Region Servers 102C-102E. FIG. 6 and FIG. 7 provide additional details of a region-based placement policy that could be implemented in the HMaster 102A to support assignment of regions to available Region Servers 102C-102E.

As illustrated in FIG. 3, the HMaster 102A assigns region 1 302E to Region Server 102C. The Region Server 102C then processes the assigned region 1 302E/304 by splitting the region 1 304 into a plurality of columns (i.e. the set of contiguous rows 1 through 6 of the table 302 are split along the various columns) corresponding to the columns 302B, 302C, 302D of the HBase data table 302. The Region Server 102C then groups each of the plurality of columns into column files 306A, 306B and 306C. Finally, the Region Server 102C converts the column files into one or more HFiles 308A, 308B, and 308C that can be stored and retrieved from the Hadoop storage layer 104, where HFiles are a data file format used by the clustered storage system 100.

The Region Server 102C then requests Hadoop 104 to store each of the one or more HFiles. When the Region Server 102C seeks to write a file to Hadoop 104, the Region Server 102C sends a file creation request to the Metadata node 104A. The Metadata node 104A responds to the Region Server 102C with the identity of one or more assigned data node(s) and the location of data blocks on the data node(s) to write the file to. In one embodiment, the size of a data block is 64 MBs.

In one instance, when the Metadata node 104A determines data node(s) for a Region Server to create a file in, the Metadata node 104A identifies the name of server 202 hosting the Region Server and provides the name of the data node collocated with the Region Server in server 202. This way, the Metadata node 104A can create data locality (i.e. placing of data close to where it is needed) between the regions (which are in turn stored in data nodes as data blocks) managed by the Region Server and the data blocks stored in the data node. In FIG. 3, the HFiles files 308A, 308B, and 308C are divided into data blocks 308A1, 308A2, 308B1, 308B2, 3088C1, 308C2 and sent to the one or more assigned data node(s). Once all data blocks are sent, the Metadata node 104A records the file creation in its metadata, including the FsImage file.

Additionally, each of the stored data blocks 308A1-308C2 of the HFiles 308A-308C are replicated across various data nodes for fault tolerance. A Regional Server 102C can specify to the storage layer 104 the number of replicas of a file to be created at the time of the file creation. The storage layer 104 will automatically replicate the data blocks, associated with the HFiles, for the specified number of times on one or more data nodes determined by the Metadata node 104A.

The Metadata node 104A makes all decisions regarding replication of the data blocks in Hadoop 104. The Metadata node 104 determines the placement of replicas on one or more data nodes by utilizing a rack-aware replica placement policy. The placement policy focuses on improving data reliability, availability, and network bandwidth utilization. As is discussed in more detail below, FIG. 4 discusses the rack-aware replica placement policy and the various pros and cons of the replica placement policy as it is being currently implemented in the Metadata node 104 of the HBase-Hadoop clustered storage systems 100. Further, FIG. 5 discusses a novel region-based placement policy that can be implemented independently or in conjunction with the rack-aware replica placement policy of the Metadata node 104A to determine the placement of data and its associated replicas on one or more data nodes.

FIG. 4 illustrates the example of a distribution of data blocks associated with multiple regions, across various data nodes in a clustered storage system 100 implemented in racks of commodity-class servers, utilizing the traditional rack-aware replica placement policy. As discussed in reference to FIG. 2, in the clustered storage system 100, a Region Server 102C-102E is collocated with a data node 104E-104G providing DataNode Services in a server 202. Further, each Region Server 102C-102E manages one or more regions of data that is generally stored in the data node 104E-104G the Region Server 102C-102E is collocated with.

In FIG. 4, the clustered storage system 100 comprises three racks 401-403 and each rack includes three commodity-class servers. Rack 401 has servers 404, 406 and 408, rack 402 has servers 410, 412 and 414, and rack 403 has servers 416, 418 and 420. Further, each commodity-class servers, e.g. server 404, hosts a Region Server 404A and a data node 404B. The Region Server 404A is assigned to manage regions 1, 2, and 3. As discussed earlier in reference to FIG. 3, when a Region Server 102C seeks to write HFiles (that are in turn related to the regions managed by the Region Server) in Hadoop 104, the Metadata node 104A assigns a data node 104E that is collocated with the Region Server 102C on the same host server 202.

As shown in FIG. 4, the regions 1-3 that are managed by the Region Server 404A is stored in the data node 404B that is collocated with the Region Server 404A on server 404. In addition, that the data stored in Hadoop 104 is stored in data blocks, the data associated with regions 1-3 are illustrated as data blocks 1, 2, 3, 4 for each of the stored regions (where the stored data blocks 1, 2, 3, 4 are associated with HFiles that are in turn associated with a respective region).

Additionally, each of the data blocks stored in Hadoop 104 is replicated across various data nodes in storage layer 104 to improve data reliability and read/write performance. The Metadata node 104A uses a rack-aware replica placement policy to manage data replication with a default replication factor of three (which includes the copy of the data being replicated as one count). The Metadata node 104A first stores the data blocks of regions 1-3 in the data node 404B collocated with the Region Server 404A seeking the write of the data blocks. The data node 404B is located in the rack1 401. Next, the Metadata node 104A stores a second replica of the stored data blocks in a data node located on a different rack and a third replica of the stored data blocks in a data node different from the second replica's data node but located on the same rack as that of the second replica.

In FIG. 4, the first replica of data block 1 of region 1 is stored in data node 404 on rack #1 401 while the second replica of data block 1 of region 1 is stored in data node 410 on rack #2 402. Finally, the third replica of data block 1 of region 1 is stored in data node 412 on rack #2 402. Similarly, the first replica of data block 2 of region 1 is stored in data node 404 on rack #1 401 but the second replica of data block 2 of region 1 is stored in data node 416 on rack #3 403. Finally, the third replica of data block 2 of region 1 is stored in data node 418 on rack #3 403. The rack-aware replica placement policy thus cuts the inter-rack write traffic, helping improve write performance.

However, with this policy, the replicas of an HFile (that is in turn associated with a region) are not evenly distributed across the racks. One third of replicas are on one node of one rack but the remaining two thirds of replicas are evenly distributed across the remaining racks. In FIG. 4, the Metadata node 104A distributes the various replica data blocks associated with a region across various data nodes without any regard to congruity between the replicated data blocks in the various data nodes. For example, the data node 410 contains the data block 1 of region 1, data blocks 2 and 3 of region 2, and data block 2 of region 3 while data node 414 contains the data block 3 of region 1, data block 2 of region 2, and data block 4 of region 3.

In such a scenario, a failure of the server 404 will disable both the Region Server 404A and the collocated data node 404B running on the server 404. The HMaster 102A in the database layer 102 will have to reassign the regions 1-3 managed by the Region Server 404A to a different Region Server running on a different server in the racks 401-403. The HMaster 102A will assign the regions 1-3 to one or more available Region Servers based on factors such as the Region Servers' current load (i.e. regions currently being managed) and data locality of the assigned regions to the Region Servers (i.e. the local availability of the replicated data of the assigned regions in the data node collocated with the Region Servers).

Here, data node 404B is the only node in storage layer 104 that locally hosts all the data blocks associated with the various regions being managed by the Region Server 404A. The other replicated data blocks associated with the various regions managed by the Region Server 404A are randomly distributed In Hadoop 104, resulting in no secondary or tertiary data node (besides data node 404B) storing all the data blocks associated a region. Therefore, none of the available Region Servers collocated with any of the remaining data nodes have data locality with the regions being reassigned by the HMaster 102A. So, the HMaster 102A reassigns the various regions to one or more Region Servers simply based on their current work load and any minimal data locality that might be available for the assigned regions.

However, such an assignment by the HMaster 102A immediately causes increased data access latency associated with the reassigned regions. For example, in FIG. 4, when Region Server 412A collocated with data node 412B on server 412 is reassigned to manage regions 1 and 2, the Region Server 412A only has data blocks 1, 3 of region 1 and data block 3 of region 2 locally available in the collocated data node 412B. When the Region Server 412A has to serve any requests associated with data blocks 2, 4 of region 1, the Region Server 412A has to fetch the data blocks from one of the data nodes located in rack #3 403, resulting in increased latency in servicing the request.

Further, when the Region Server 412A has to serve any requests associated with data block 2 of region 2, the Region Server 412A has to fetch the data blocks from one of the data nodes located in the local rack #2 402. Thus, the reassignment of regions in the event of a failure of a server (and the associated Region Server and data note) in a storage layer 104 utilizing the rack-aware replica placement policy causes increased data access latency for the reassigned regions. So, by modifying the placement of a data and its replica data in Hadoop 104, some of the drawbacks of the currently implemented rack-aware replica placement policy can be addressed in the HBase-Hadoop clustered storage system 100. FIG. 5 discusses a novel region-based data placement policy that can be implemented independently or in conjunction with the rack-aware replica placement policy of the Metadata node 104A to determine the placement of data and its associated replicas on one or more data nodes.

In accordance with the technique introduced here, to achieve a better distribution of data blocks and its associated replica data in the clustered storage system 100 which provides, among other benefits, increased fault tolerance, a region-based placement policy is provided. FIG. 5 illustrates the distribution of data blocks associated with regions 1-3 utilizing the region-based placement policy. The data blocks are distributed across various data nodes in the rack based clustered storage system 100. In the region-based placement policy, the data blocks associated with a region are stored and replicated in different data nodes at a region level instead of at a block level. Here, as shown in FIG. 3, the data blocks belong to one or more HFiles that are in turn associated a region.

In FIG. 5, when Region Server 504A that manages regions 1-3 requests the Metadata node 104A to store data blocks associated with the regions 1-3, the Metadata node 104A stores the data blocks in data node 504B that is collocated with Region Server 504A in server 504. Further, if the replication factor for the stored data blocks is three, the Metadata node 104A creates two additional copies of each of the stored data blocks and stores them across different data nodes in the storage layer 100. Here, the region-based placement policy distributes the replica data differently from the rack-aware placement policy. In the rack-aware placement policy, the Metadata node 104A focuses on distributing the replica data blocks across different data nodes within a rack without any emphasis on the data congruence amongst the replica data blocks stored on a data node.

In the region-based placement policy, the Metadata node 104A focuses on not only distributing the replica data blocks across different data nodes within a rack but also the data congruence amongst the replica data blocks stored on a data node. The Metadata node 104A can achieve data congruence amongst the replica data blocks stored on a data node by storing a replica of all the data blocks associated with a region in the data node. For example, in FIG. 5, in addition to the copy of all the data blocks associated with region 1 that is stored in data node 504B, a second replica of all the data blocks associated with region 1 is replicated and stored in data node 510B on rack #2 502. Further, a third replica of all the data blocks associated with region 1 is replicated and stored in data node 512B on rack #2 502. Thus, the region-based placement policy can not only achieve rack-aware data placement but also data congruence amongst the replicated data blocks.

The region-based placement policy has many advantages over the rack-aware placement policy. For one, the data distribution based on the region-based placement policy increases the fault tolerance of the clustered storage system 100 over the data distribution based on the rack-aware data placement. This is because the chances of three randomly failed data nodes having at least one overlapping data block (a scenario possible in the rack-aware data placement) is higher than the chances of three specific data nodes having to fail to have an overlapping data block (a scenario possible only in the region-based data placement). Further, the data congruity in the replicated data enables the HMaster 102 to reassign regions to different Region Servers without incurring the increased data access latency associated with the reassignment of regions in the clustered storage system 100 implementing the rack-based placement policy.

For example, in FIG. 5, the HMaster 102 can reassign regions 1-3 managed by Region Server 504A in the event of a failure of server 504 hosting the Region Server 504A and its collocated data node 504B or simply to better balance the load across the various servers. The HMaster 102 can for instance assign Region Server 510A collocated with data node 510B on server 510 to handle the region 1. Here, that all the data blocks associated with region 1 is stored in data node 510B, there is data locality for the region 1 being managed by the Region Server 510A. Therefore, the Region Server 510A can serve data access requests relating to region 1 without creating any additional data access latency. Similarly, the HMaster 102 can assign Region Server 518A collocated with data node 518B on server 518 to manage region 2 without creating any additional data access latency. Also, by being able to assign the different regions to different nodes on different racks, the HMaster 102 can avoid spikes in network switch traffic in the event of failure of a server on the clustered storage system 100.

As discussed earlier, the region-based placement policy can be implemented independently or in conjunction with the rack-aware replica placement policy of the Metadata node 104A. In one embodiment, the region-based placement policy can be implemented within the Metadata node 104A. In this case, that Metadata node 104A receives the data blocks as part of a HFile without any information regarding the region the HFile is associated with, the Metadata node 104A needs to determine the region of a HFile and track the regions of the various HFiles stored within Hadoop 104 to implement a region-based placement policy. In one instance, the Metadata node 104A can request the Region Servers writing the HFiles in Hadoop 104 to provide the region number of the HFile being written. By tracking and analyzing the region information, the Metadata node 104A can identify when a set of data blocks of a HFile is associated with a region and distribute the data blocks according the region-based placement policy.

In another embodiment, the region-based placement policy can be implemented within the HMaster 102A. When storing a region of a table with a replication factor of three, the HMaster 102A determines three data nodes, a primary, a secondary and a tertiary node, to store each of the three replicas of the region. The primary data node will generally be the data node collocated with the Region Server the region is assigned to. The secondary and tertiary data nodes could be to store the other two replicas of the region. The HMaster 102A determines the three data nodes based on various factors such as current load of each data node and their associated latencies, potential impact on network switch traffic from storing in each data node, potential impact on failure of each data node, etc. FIG. 7 provides additional details on the process used by the HMaster 102A for determining the various data nodes for storing a region in.

The HMaster 102A then assigns the region to a Region Server 102C along with the three determined data nodes to store the region in. The Region Server 102C splits the region into various HFiles and sends a write/creation request to Hadoop 104 for each of the HFiles along with the three suggested data nodes (i.e. the primary, the secondary and the tertiary node). The Metadata node 104A could make a best effort to store each of the three replicas of the data blocks associated with each HFile in the suggested data nodes. that the Region Server 102C provides the same three data nodes for each of the HFiles associated with a region, the Metadata node 104A can achieve region-based placement of data blocks associated with a region by storing the data blocks in the provided data nodes. Such region-based placement of the data blocks doesn't require the Metadata node 104A to have any knowledge of the various available regions or how the different data blocks are related to the various regions.

FIG. 6 illustrates an example process, based on the region-based placement policy, which is used by the clustered storage system 100 to store a received data table. In step 605, the clustered storage system 100 receives a HBase data table 302 to store within the clustered storage system 100. In step 610, the HMaster 102A of the clustered storage system 100 segments the table into one or more regions. Next, in step 615, for each of the one or more regions formed in step 610, the HMaster 102A determines a primary, a secondary, and a tertiary data node in Hadoop 104, where the number of data nodes to be determined is based on the number of times each region is to be replicated in Hadoop 104. Here, the replication factor is set to three. Therefore, each of the three data nodes is to store a replica of the data associated with a region in its entirety.

The primary data node will generally be the data node collocated with the Region Server the HMaster 102A assigns the region to. The secondary and tertiary data nodes could be to store the other two replicas of the region. The HMaster 102A determines the three data nodes based on various factors such as current load of each data node and their associated latencies, potential impact on network switch traffic from storing in each data node, potential impact on failure of each data node, etc. FIG. 7 provides additional details on the process used by the HMaster 102A for determining the various data nodes for storing a region in.

In step 620, the HMaster 102A assigns each of the one or more regions to an available Region Server 102C-102E along with the three determined data nodes to store the replicas of the region in. Here, each region is assigned to the Region Server 102C-102E that is collocated with the primary data node 104E-104G determined in step 615. Next, in step 625, each Region Server 102C-102E splits their assigned region into various HFiles (as shown in FIG. 3) and sends a write/creation request to Hadoop 104 for each of the HFiles along with the three suggested data nodes (i.e. the primary, the secondary and the tertiary node).

In step 630, for each of the HFiles of the region, the HMaster 102 receives a status report from Hadoop 104 indicating the success of storing the HFile in the three determined data nodes. In one instance, the Metadata node 104A of Hadoop 104 makes a best effort to store each of the three replicas of the data blocks of a HFile in the suggested three data nodes and returns a status report to the HMaster 102A. The status report could include where the three replicas of the data blocks of each HFile were finally stored in Hadoop 104. The status report could be used by the HMaster 102A to keep track of the actual distribution of the various data blocks associated with a region. The HMaster 102A could use the actual distribution of the various data blocks when determining three data nodes for newly created regions.

FIG. 7 illustrates an example process used by the HMaster 102A for determining three data nodes (where the replication factor is set to three) for storing the data replicas of a region in. The HMaster 102A determines the various data nodes based on factors such as current load of each Region Server 102C-102E, the current load of the data nodes collocated with the Region Servers 102C-102E and their associated latencies, potential impact on failure of each data node, etc. At step 705, the HMaster 102A determines the current primary regions being managed by each of the Regions Servers 102C-102E. that the primary data node is generally the data node collocated with the Region Server 102C-102E a region is assigned to, the HMaster 102A uses the current work load of each of the Regions Servers 102C-102E to identify one or more Region Servers with relatively higher bandwidth to manage a new region.

At step 710, the HMaster 102A determines the current secondary and tertiary regions being hosted by each Region Server 102C-102E. Here, the HMaster 102A treats the replicas of a region as secondary or tertiary region when the replicas of the region are stored on the data nodes collocated with Regions Servers 102C-102E that are not the primary managers of the region. While the above Region Servers 102C-102E are not the primary managers of the replica regions, the Region Servers 102C-102E could become the primary manager in the event of a failure of the current primary manager of the regions. The HMaster 102A determines a potential work load of each of the Regions Servers 102C-102E in the event of a failure of various data nodes and identifies one or more Region Servers which still have relatively higher bandwidth to handle additional regions.

At step 715, for a replication factor of three, the HMaster 102A identifies at least three data nodes collocated with the Region Servers identified in steps 705 and 710 which provide the optimal load balancing with the newly stored region. Here, an optimal load balance would be when a Region Server assigned the new region experiences minimal increase in latency in servicing data access requests from clients. At step 720, the HMaster 102A identifies at least three data nodes from the identified data nodes in steps 715 which provide the optimal data protection with the newly stored region. Here, an optimal data protection would be when the chances of the three identified data nodes all being disabled at the same time is lower than the chances of any other combination of three other identified data nodes all being disabled at the same time. In step 725, the HMaster 102A returns the identified storage nodes as primary, secondary and tertiary data nodes along with the assigned region to the Region Server 102C-102E that is collocated with the identified primary data node.

Figure 8:
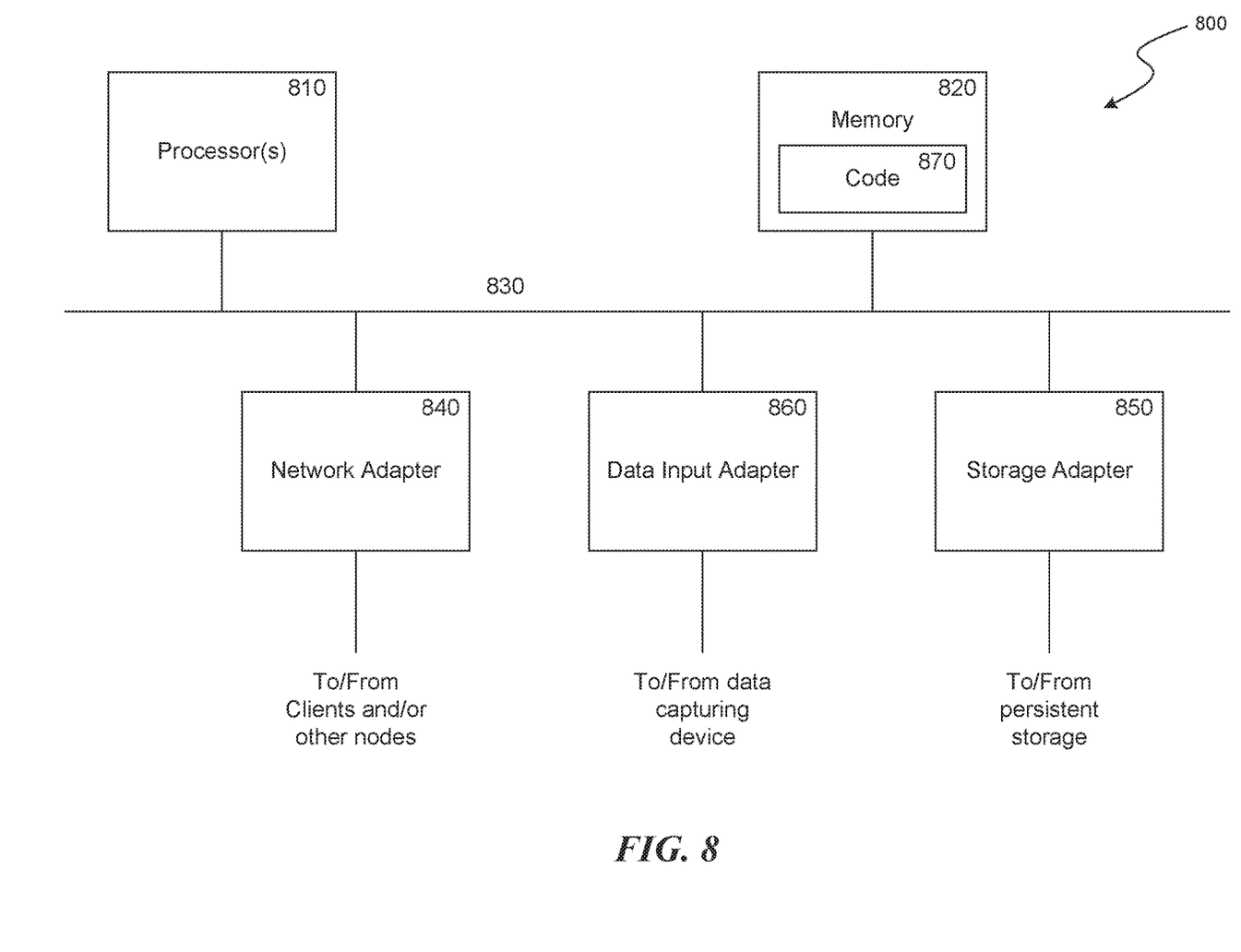
FIG. 8 is a high-level block diagram showing an example of the architecture of a node.

FIG. 8 is a high-level block diagram showing an example of the architecture of a server node 800, which may host any of the data nodes 104E-104G or Region Servers 102C-102E. The server node 800 includes one or more processors 810 and memory 820 coupled to an interconnect 830. The interconnect 830 shown in FIG. 8 is an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the storage controller 800 and, thus, control the overall operation of the node 800. In certain embodiments, the processor(s) 810 accomplish this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the node 800. The memory 820 represents any form of random access memory (RAM), read-only memory (ROM), flash memory, or the like, or a combination of such devices. In use, the memory 820 may contain, among other things, code 870 embodying at least a portion of a storage operating system of the node 800. Code 870 may also include a snapshot module stored in the memory that is executable by the processor to generate a snapshot of at least a portion of the data stored in the data nodes, an analysis module stored in the memory that is executable by the processor to process analytic tasks based on the snapshot and real-time acquired data without a need to connect to a main Hadoop cluster, and/or an integration module stored in the memory that is executable by the processor to virtually instantly integrate real-time acquired data into a main Hadoop cluster.

Also connected to the processor(s) 810 through the interconnect 830 are a network adapter 840 and a storage adapter 850. The network adapter 840 provides the server node 800 with the ability to communicate with client devices, such as mobile devices, over a network and may be, for example, an Ethernet adapter or Fibre Channel adapter. The network adapter 840 may also provide the server node 800 with the ability to communicate with other nodes within the data clustered storage. In some embodiments, a node may use more than one network adapter to deal with the communications within and outside of the data clustered storage separately. The storage adapter 850 allows the server node 800 to access a persistent storage, and may be, for example, a Fibre Channel adapter or SCSI adapter. Server node 800 can further includes a data input adapter 860 for receiving acquired data from a data capturing device on or in a vehicle.

The code 870 stored in memory 820 may be implemented as software and/or firmware to program the processor(s) 810 to carry out actions described below. In certain embodiments, such software or firmware may be initially provided to the node 800 by downloading it from a mobile system through the node 800 (e.g., via network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as herein, can include, for example, programmable circuitry programmed with specific software and/or firmware, special-purpose hardwired circuitry, or a combination thereof.

What is claimed is:

1. A clustered storage system comprising:
   a memory;
   one or more processors; and a master module that is in communication with one or more of multiple data nodes and that facilitates storage of data in the multiple data nodes,
wherein the master module is configured to, when executed by the one or more processors: receive client data from a client system, wherein the client data comprises a data table including multiple rows and multiple columns;
divide at least a portion of the data table, comprising at least two consecutive rows of the multiple rows and including less than all of the multiple rows, into two or more data files such that each data item in the portion of the data table with a common first column identifier is in a first of the two or more data files and each data item in the portion of the data table with a common second column identifier is in a second of the two or more data files;
store the two or more data files in a primary data node by sending first file creation requests corresponding to each of the two or more data files; and
store a replica of the portion of the data table, including replicas of the two or more data files, in a secondary data node by sending second file creation requests corresponding to each of the two or more data files, wherein the replica of the portion of the data table is created by:
determining two or more of the multiple data nodes to be used to store the replica of the portion of the data table, wherein each of two or more data nodes comprises a region server that manages data access requests from clients to a set of regions managed by the region server and that communicates with a distributed file system; and
for each set of regions, creating data locality between congruent regions within the set of regions and an associated region server that manages data access to the congruent regions by co-locating the congruent regions on a same data node on which the region server is running.

2. The clustered storage system of claim 1, wherein processes for selecting the primary data node and selecting the secondary data node are each performed according to a placement policy maintained in association with the master module;
wherein the first file creation requests each identify the selected primary data node; and
wherein the second file creation requests each identify the selected secondary data node.

3. The clustered storage system of claim 1, wherein the primary data node is stored on a first rack and the secondary data node is stored on a second rack different from the first rack; and wherein at least the first rack includes at least two data nodes.

4. The clustered storage system of claim 1 further comprising a metadata node that stores a mapping of each of the two or more data files to a corresponding set of consecutive rows of the multiple rows.

5. The clustered storage system of claim 1, wherein each of the two or more data files are HFiles that are configured to have a file format for use with a scalable storage and processing system distributed across multiple clusters of computing systems.

6. The clustered storage system of claim 1, wherein storing the replica of the portion of the data table includes: processing, by the master module, a plurality of write requests, each write request corresponding to one or more of the data files associated with the portion of the data table.

7. The clustered storage system of claim 1, wherein data in at least one data file of the two or more data files is stored as two or more data blocks in an associated data node.

8. The clustered storage system of claim 7 further comprising a name node configured to store an index that includes a mapping of each of the two or more data blocks to a corresponding one of the two or more data files.

9. The clustered storage system of claim 1, wherein the primary data node and the secondary data node constitute at least a portion of a scalable storage and processing system distributed across multiple clusters of computing systems.

10. A non-transitory computer-readable storage medium storing instructions of a master module that, when executed by a computing system, cause the computing system to perform operations for storing data in a clustered storage system, the clustered storage system including a plurality of storage nodes, the operations comprising:
receiving data to be stored in the clustered storage system; and
for at least one selected region of a plurality of regions of the data, each region comprising consecutive rows of the received data,
dividing the selected region into two or more data files such that each of multiple data item in the selected region with a common first column identifier is in a first of the two or more data files and each of the multiple data item in the selected region with a common second column identifier different from the common first column identifier is in a second of the two or more data files;
storing a first replica of the selected region, including first replicas of the two or more data files, in a first data node; and
storing a second replica of the selected region, including second replicas of the two or more data files, in a second data node different from the first data node;
wherein each of the plurality of storage nodes comprises a region server that manages data access requests from clients to a region managed by the region server and that communicates with a distributed file system; and
wherein storing the first replica comprises creating data locality between the selected region, a region that is congruent with the selected region, and an associated region server that manages data access to the selected region and the congruent region by co-locating the selected region and the congruent region on a same data node on which the region server is running.

11. The non-transitory computer-readable storage medium of claim 10, wherein storing the first replica of the selected region is performed by sending a file creation request corresponding to each of the two or more data files, the file creation request configured for a scalable storage and processing system distributed across multiple clusters of computing systems.

12. The non-transitory computer-readable storage medium of claim 10, wherein the operations further comprise storing a mapping of each of the two or more data files to a corresponding region.

13. The non-transitory computer-readable storage medium of claim 10, wherein the operations further comprise receiving a status report indicating the success of storing the selected region in a corresponding storage node.

14. The non-transitory computer-readable storage medium of claim 10, wherein storing the first replica of the selected region and storing the second replica of the selected region includes processing a plurality of sub-write requests, wherein each sub-write request corresponds to one of the two or more of the data files.

15. The non-transitory computer-readable storage medium of claim 10, wherein each of the two or more data files is stored as a set of one or more data blocks in a storage node, wherein the set of one or more data blocks corresponding to each of the two or more data files does not overlap with the one or more data blocks corresponding to any other of the two or more data files.

16. A method comprising:
receiving, via a master module executing on a processing unit, data comprising a data table to be stored; and
for at least one selected part of the data table,
dividing, based on data columns of the data table, the selected part of the data table into two or more data regions by dividing at least one selected row of the selected part of the data table such that a first portion of the selected row is in a first of the two or more data regions and a second portion of the selected row is in a second of the two or more data regions, wherein the two or more data regions comprise congruent regions of data; and
assigning, based on the data of the two or more data regions being congruent, a region server that to manages access requests from clients to the two or more data regions and that communicates with a distributed file system;
determining two or more of multiple data nodes to be used to store the data table; and creating data locality between the two or more data regions and the region server by co-locating the congruent regions of data on a same data node, of the two or more multiple data nodes, on which the region server is running.

17. The method of claim 16, wherein the selected part of the data table includes less than each row of the data table.

18. The method of claim 16, further comprising:
determining that a data node on which the region server is running is a primary data node; selecting secondary and tertiary data nodes for storing replicas of the two or more data regions.

19. The method of claim 18, wherein selecting the secondary and tertiary data nodes comprises:
identifying data nodes within a same server rack as the primary data node; and
collocating the secondary and tertiary data nodes with the primary data node by selecting, as the secondary and tertiary data nodes, the data nodes within the same server rack as the primary data node.

20. The method of claim 18, further comprising:
for each region in the two or more data regions, requesting that a corresponding region server send write requests for files to a storage layer file system; and
receiving a status report for the storage layer file system indicate the success of storing the files of a given region.

* * * * *

UNITED STATES PATENT AND TRADEMARK OFFICE
CERTIFICATE OF CORRECTION

PATENT NO. : 10,521,396 B2
APPLICATION NO. : 14/996627
DATED : December 31, 2019
INVENTOR(S) : Kannan Muthukkaruppan et al.

Page 1 of 1

It is certified that error appears in the above-identified patent and that said Letters Patent is hereby corrected as shown below:

In the Claims

In Column 15, Line 37, Claim 1, delete "co-locating" and insert -- collocating --, therefor.

In Column 16, Line 46, Claim 10, delete "co-locating" and insert -- collocating --, therefor.

In Column 17, Line 24, Claim 16, delete "that to" and insert -- that --, therefor.

In Column 18, Line 2, Claim 16, delete "co-locating" and insert -- collocating --, therefor.

Signed and Sealed this
Second Day of June, 2020

Andrei Iancu
*Director of the United States Patent and Trademark Office*